(12) United States Patent
Delesalle et al.

(10) Patent No.: US 7,636,375 B2
(45) Date of Patent: Dec. 22, 2009

(54) METHOD FOR MULTIMEDIA FLOW TRANSPORT

(76) Inventors: Christophe Delesalle, 6 rue des jonquilles, Perros-Guirec (FR) 22700; Stephane Statiotis, 20 Lann Ar C'hoat, Pleumeur Bodou (FR) 22560; Christian Wipliez, 2 park Haleg, Lannion (FR) 22300

( * ) Notice: Subject to any disclaimer, the term of this patent is extended or adjusted under 35 U.S.C. 154(b) by 462 days.

(21) Appl. No.: 10/502,043

(22) PCT Filed: Feb. 3, 2003

(86) PCT No.: PCT/FR03/00321

§ 371 (c)(1), (2), (4) Date: Jan. 19, 2005

(87) PCT Pub. No.: WO03/067831

PCT Pub. Date: Aug. 14, 2003

(65) Prior Publication Data

US 2005/0117612 A1 Jun. 2, 2005

(30) Foreign Application Priority Data

Feb. 5, 2002 (FR) .................................. 02 01333

(51) Int. Cl.
*H04J 3/02* (2006.01)
(52) U.S. Cl. .................................................... 370/537
(58) Field of Classification Search .................. 370/535
See application file for complete search history.

(56) References Cited

U.S. PATENT DOCUMENTS 6,272,151 B1 8/2001 Chen et al.
6,788,696 B2* 9/2004 Allan et al. .................. 370/411
7,170,905 B1* 1/2007 Baum et al. .................. 370/467
2002/0046406 A1* 4/2002 Chelehmal et al. ............ 725/87
2006/0056298 A1* 3/2006 Nag et al. .................... 370/230

FOREIGN PATENT DOCUMENTS

WO 01 26301 4/2001

OTHER PUBLICATIONS

Lin, Mengjou et al. "An Experimental ATM-based Video-on-demand System on a Macintosh Platform", Local Computer Networks, pp. 59-68, XP010200673, ISBN: 0-8186-7617-5 Oct. 13, 1996.
Veeraraghavan, M. et al. "ATM switch routers for combined connection-oriented and connectionless transport", IEEE Global Telecommunications Conference. vol. 3, pp. 1481-1487, XP000737772, ISBN: 0-7803-4199-6 Nov. 3, 1997.

* cited by examiner

*Primary Examiner*—Kwang B Yao
*Assistant Examiner*—Tung Q Tran
(74) *Attorney, Agent, or Firm*—McDonnell Boehnen Hulbert & Berghoff LLP

(57) ABSTRACT

A method and system for transferring to a same client terminal at least a first flow with a first service quality and at least a second flow with a second service quality. The first flow is transmitted to the client terminal through an unconnected network, and the second flow is transmitted to the client terminal by a content server through a connected network after network resource booking with service quality by exchanging messages via the unconnected network. The method establishes a high throughput link between the client terminal and the content server, and transmits the second flow with the booked service quality to the client terminal through the high throughput link.

9 Claims, 3 Drawing Sheets

METHOD FOR MULTIMEDIA FLOW TRANSPORT

TECHNICAL FIELD

Figure 1:
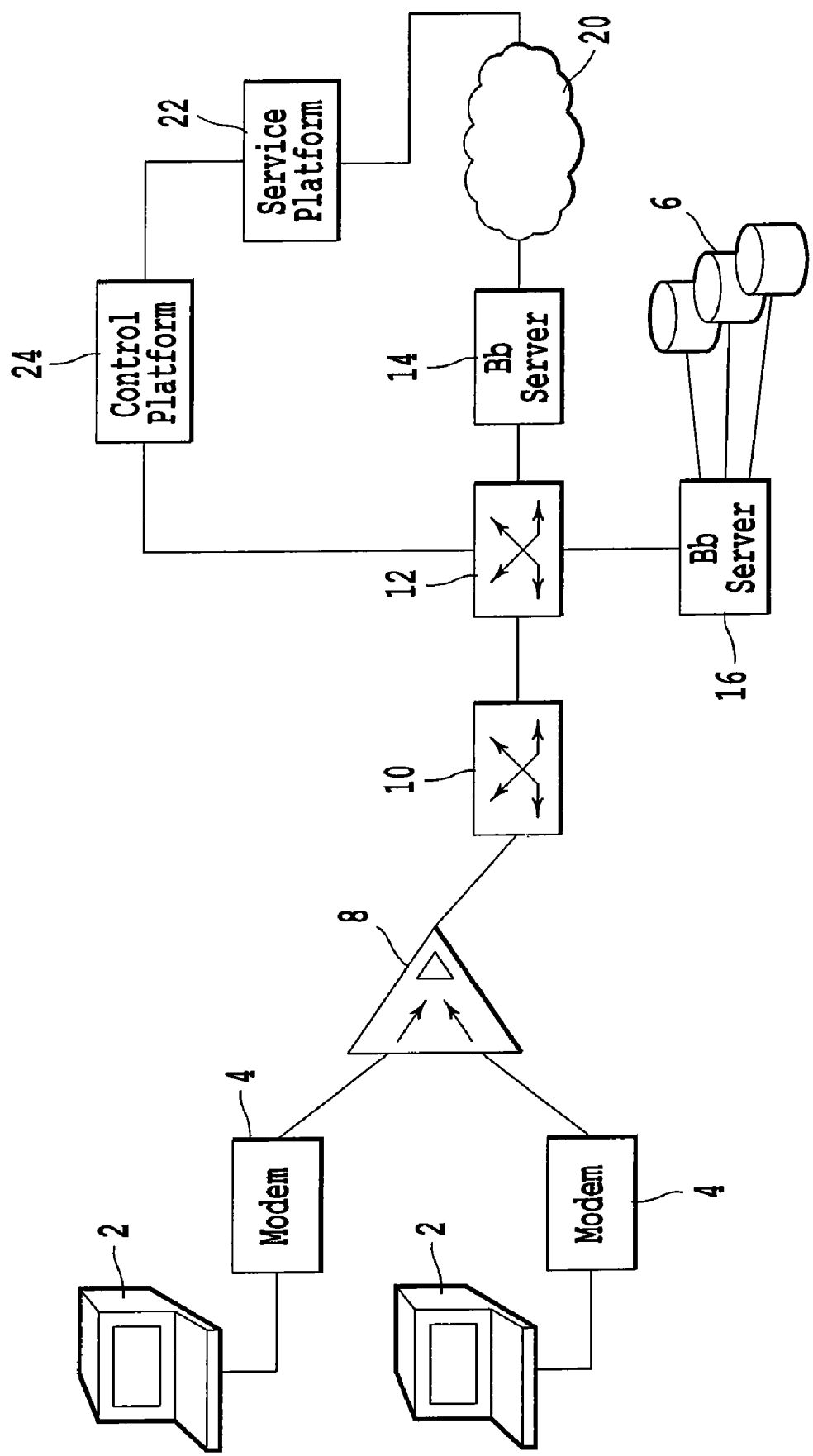

The present invention is located within the field of transferring data flows through a data exchange network and is more specifically related to a method and a system for transferring at least two data flows with different service quality (Qos) requirements to a same terminal.

STATE OF THE PRIOR ART

The mechanism for transferring and switching data flows, such as IP flows, is based on the routing principle.

A router is an interface between two networks which may use different protocols, for letting flows pass through it, either native IP or encapsulated in another protocol such as ATM (Asynchronous Transfer Mode), for example. The routing is generally based on analyzing the header of the packets to be transferred.

Let us recall that for performing the routing of packets in a mesh network, a node should know the state of all the other nodes before deciding or sending a packet. This cannot be achieved presently. Also, as a first step, the routing is supported by several components among which are a packet switch and a routing table. A switching node is generally formed with output lines which transmit frames obtained from packets. The packets are routed by the switch towards an output line from the routing table.

In a known art, the routing may be performed in a centralized way from a central node which makes the decision relatively to the definition of a new routing table and to its sending to the different network stations. This central node receives information from all the components of the network and designs its routing table according to algorithms determined beforehand. Among the items which may be taken into account to establish this new routing table, let us mention:
- the cost of the links;
- the cost of passing in a node;
- the requested throughput;
- the requested transit delay;
- the number of nodes to be crossed;
- the transfer security for certain classes of packets;
- the occupation of the switching node's memories;
- the occupation of the line couplers.

Let us also mentioned the so-called fixed routing in which the routing table does not vary over time. This routing consists of sending each packet entering the node in the same direction generally corresponding to the shortest route algorithm.

A more developed technique consists of sending routing tables asynchronously.

Another known principle, MPLS (MultiProtocol Label Switching) enables IP flows to transit in different directions by means of overencapsulation of the same packets. With this, the flows may be classified so as to transfer them on networks with different service quality (QoS) without changing the principles of the routers and the routing mechanisms used.

It appears that with the techniques described above, it is not possible to direct IP packets with different service qualities in a network of standard pieces of equipment, unless the destination addresses of these packets are broadcasted for example with a protocol of the Protocol Index Multicast type, in which the broadcast addresses belong to a family of predetermined addresses. As a result, the routing is only possible for addresses known beforehand.

This is not compatible with multicast mode data transmission towards a plurality of terminals.

More specifically, the broadcast of addresses is not adapted to the distribution of data or audiovisual programs through an open network such as the Internet network.

French patent application No. 99 1352, filed by the applicant on Oct. 4, 1999, describes a protocol with which a calling terminal may book network resources with service quality through an unconnected network in order to establish a connection through a connected network with a called terminal.

The invention described in this application is limited to the resource booking GSMP (Generic Switch Management Protocol) and P1520 protocols described in the article "IEEE, p-1520 Standards Initiative for Programmable Network Interface", IEEE Communications Magazine, vol. 36, No. 10, pp. 64-70, October 1998, published by J. BISWAS, A A. LAZAR, J. F. HUARD, K. S. LIM, S. MAHJOUB, L. F. PAU, M. SUZIKI, S. TORTENSSON, W. WANG and S. WEISTEIN. Consequently, the invention is solely applied to ATM flows transported on a connected mode ATM network. Moreover, the method described in this application does not provide transparent multiplexing of flows with different service qualities.

The object of the invention is to overcome the insufficiencies of the prior art described above by means of a method and of a system enabling IP data flows from at least two different pieces of equipment with different service quality requirements towards a same terminal.

Another object of the invention is to combine a protocol of a connected network and a protocol of an unconnected network to transfer digital data with high throughput towards a same client terminal.

Another object of the invention is to distribute said data through a telephone line by using sXDL technology.

DISCLOSURE OF THE INVENTION

The invention therefore provides a method for transferring to a same client terminal, at least a first flow with a first service quality and at least a second flow with a second service quality, said first flow being transmitted to the client terminal through an unconnected network, and said second flow being transmitted to said client terminal by a content server through a connected network, after network resource booking with service quality by exchanging messages via the unconnected network.

The method according to the invention further includes the following steps:
- establishing a high throughput link between the client terminal and the content server;
- multiplexing the first and second flow into a same flow;
- transmitting the multiplex obtained at the client terminal through said high throughput link.

According to the invention, said high throughput link is of the xDSL type.

In a particular application of the method according to the invention, the second flow represents audiovisual data and the first flow represents signals for controlling the second flow.

According to a preferred embodiment of the invention, the unconnected network is the Internet network and the connected network is an ATM (Asynchronous Transfer Mode) network.

In this case, the method further includes a step consisting of sending at least one external command to the ATM network from a network control platform in order to establish the high throughput link between the content server and the client terminal. The first flow and the second flow are multiplexed into a same flow and transmitted to the client terminal via the established high throughput connection.

In the preferred embodiment, several terminals request audiovisual data, within the framework of a VoD (Video On Demand) application for example, the transmission of the audiovisual flows towards a client terminal includes the following steps:

connecting the client terminal to a service platform via the Internet network for requesting the audiovisual contents;

identifying the server of the audiovisual contents;

booking through a control platform, network resources with the predetermined service quality between the audiovisual server and the client terminal;

activating a point-to-point (PPP) (Point to Point Protocol) session between said audiovisual server and the client terminal with the service quality (QoS) established previously;

broadcasting said audiovisual contents with the associated control (reading, pause, backward . . . ) signals to the client terminal through the ATM network.

The invention also relates to a system for transferring to a same client terminal at least a first flow with a first service quality and at least a second flow with a second service quality, said first flow being transmitted to the client terminal through an unconnected network, and said second flow being transmitted to said client terminal by a content server through a connected network after network resource booking with service quality by exchanging messages via the unconnected network.

The system according to the invention includes:

means for establishing a high throughput link between the client terminal and the content server;

means for multiplexing the first and second flow into a same flow;

means for transmitting the multiplex obtained at the client terminal through said high throughput link.

In a preferred embodiment of the invention, said means for establishing a high throughput link between the client terminal and the content server include a digital multiplexer of the DSLAM (Digital Subscriber Line Access Multiplexer) type and at least one ATM switch for connecting the client terminal to the content server.

The system according to the invention further includes a first high throughput BAS (Broadband Access Server) server for providing a high throughput link via the Internet network between the ATM network and a control network, and a second high throughput BAS server for providing a high throughput link between the client terminal and an audiovisual data server.

SHORT DESCRIPTION OF THE DRAWINGS

Others features and advantages of the invention will be apparent from the description which follows, taken by way of a non-limiting example, with reference to the appended figures wherein:

FIG. 1 schematically illustrates a system for transferring data flows to a client terminal according to the invention from a content server.

Figure 2:
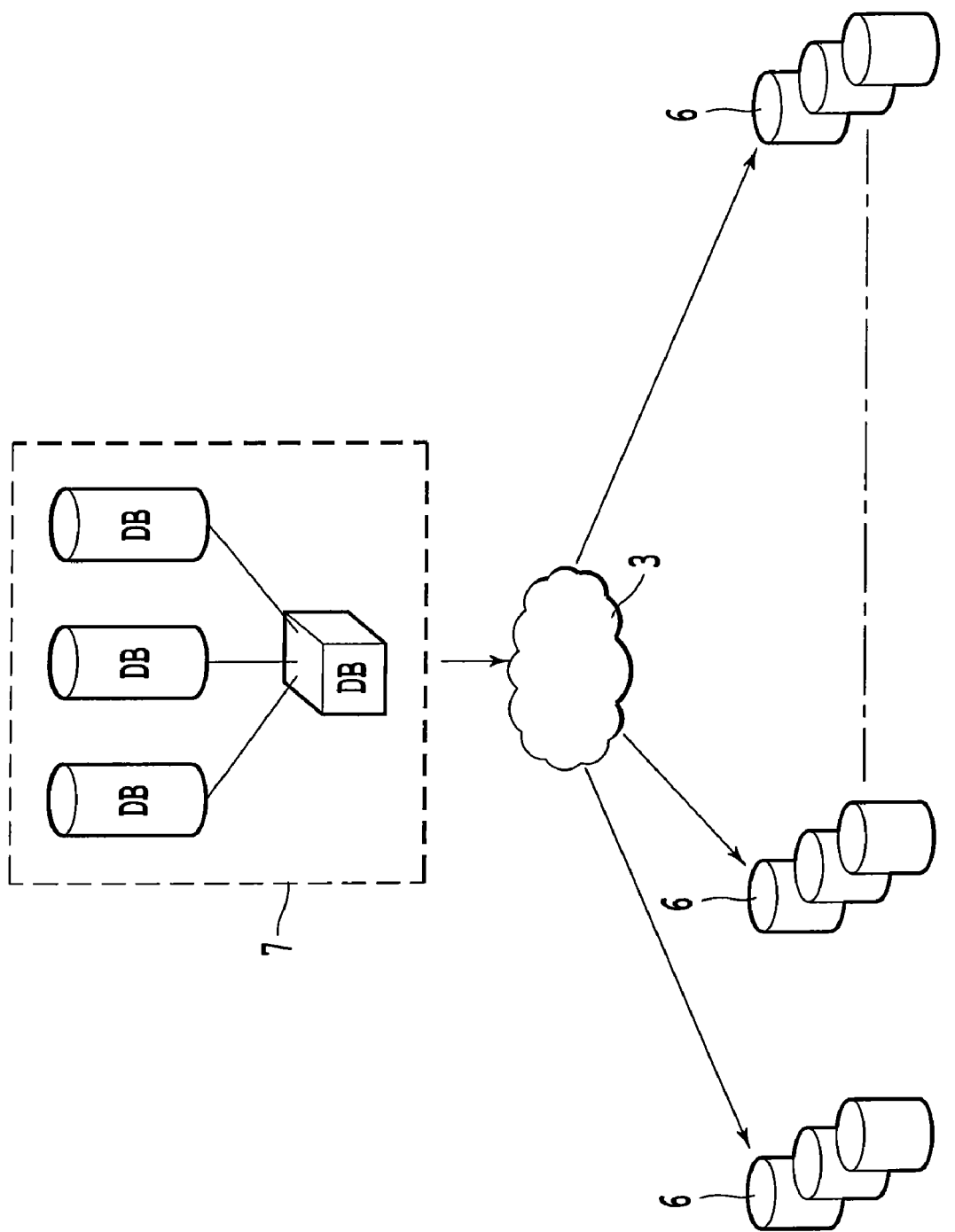

FIG. 2 schematically illustrates a distribution of content servers by geographic zones.

Figure 3:
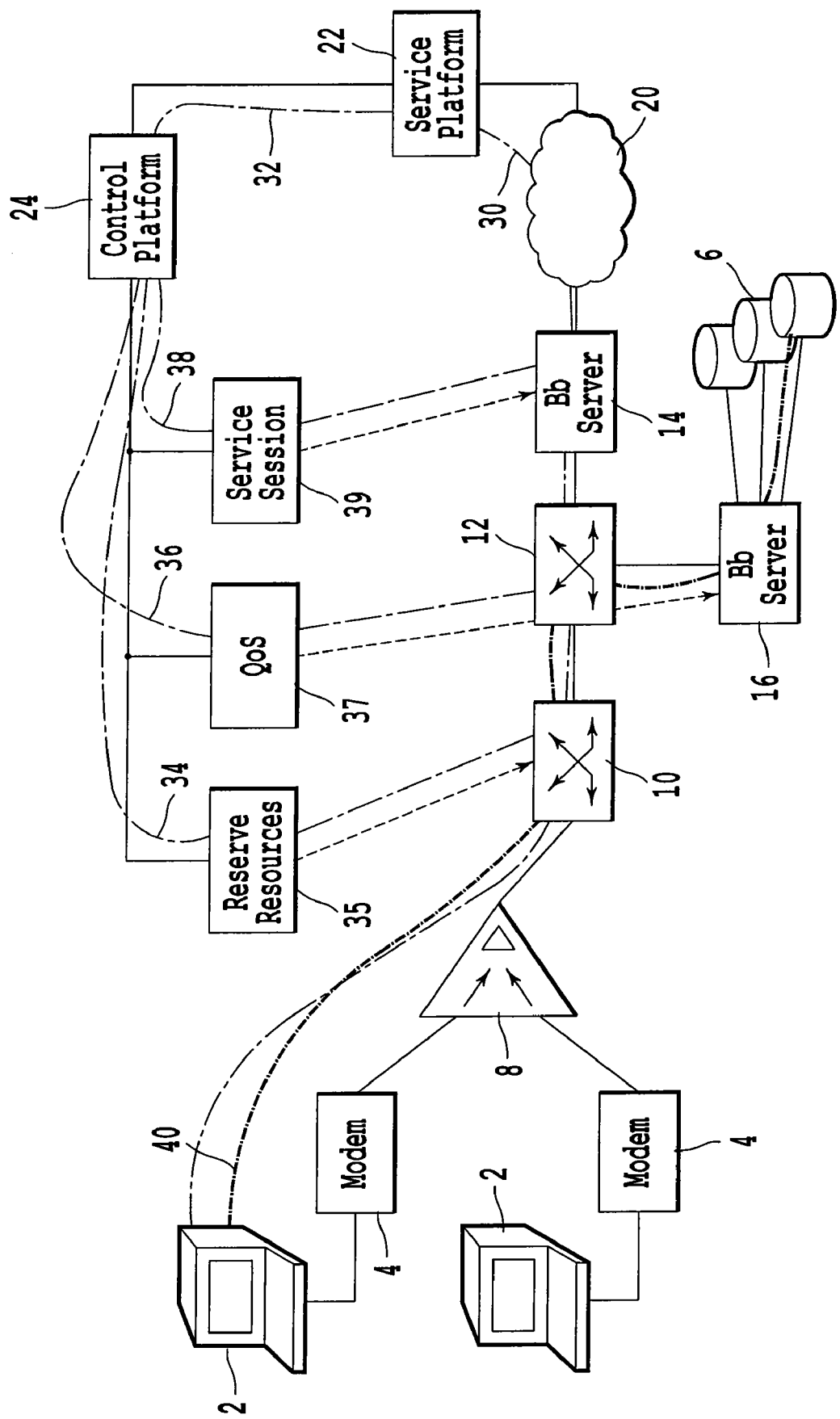

FIG. 3 illustrates a partial functional diagram of a preferred embodiment of the method according to the invention.

DETAILED DISCLOSURE OF SPECIFIC EMBODIMENTS

The following description relates to a specific exemplary application of the invention consisting of combining the ATM (Asynchronous Transfer Mode) protocol and the IP protocol (Internet Protocol) in order to design a VoD (Video on Demand) application which receives requests for distributing films sent by client terminals through the Internet network and which sends back to the requesters the audiovisual data encapsulated in a flow with service quality through an ATM network.

With reference to FIG. 1, a client terminal 2 provided with a modem 4 is able to be connected through the system according to the invention to a video server 6 among a plurality of geographically distributed video servers.

As schematically illustrated by FIG. 2, the audio visual programs may be stored in a central data base 7 accessible to different content servers via a broadband network 3.

The system of FIG. 1 includes a digital multiplexer 8 of the DSLAM (Digital Subscriber Line Access Multiplexer) type, laid out between the modem 4 and a first ATM switch 10. A second ATM switch 12 is connected to the first ATM switch 10, to a first broadband BAS (Broadband Access Server) server 14 and to a second broadband server 16, respectively. The first broadband server 14 is connected via the Internet network 20 to a service platform 22 which communicates with a control platform 24 able to send network commands to the first switch ATM 10, to the second ATM switch 12, to the first broadband BAS (Broadband Access Server) server 14 and to a second broadband server 16.

The method for transferring to the client server 2 the audiovisual flow with service quality will be described with reference to FIG. 3, wherein the different steps of the method are illustrated by arrows connecting the different pieces of equipment of the system.

In step 30, the requester of an audiovisual program sends a standard request for connecting to the service platform 22 via the Internet network 20.

After authentication and localization of the client by the service platform 22 via the control platform 24, the service platform 22 identifies the proximity video server 6 of the client among the distributed content servers 6.

In an alternative embodiment, if the audiovisual content desired by the client is not found on an identified proximity server, the control platform 24 dynamically creates a high throughput link between the data base 7 and the proximity server 6 through the broadband network 3. In step 32, the service platform 22 accesses the control platform 24 which sends to the first ATM switch 10 (step 34), external commands (establishment/release of an ATM connection) for reserving the network resources with the service quality required for the requested service between the client terminal 2 and the video server 6. The procedure for booking network resources is described in detail in French patent application No. 99 12352, filed by the applicant on Oct. 4, 1999.

In step 36, the control platform 24 activates a service session (PPP) between the client terminal 2 and the first broadband BAS server 14 dedicated to video. This session (PPP) is based on the connection with QoS established in step 34.

In step 40, the service platform 22 starts the video application at the client and controls the broadcasting of the flow of audiovisual data with the booked service quality.

The video channel with the thereby created QoS is used for transferring the multimedia flow towards the client terminal 2 through the digital multiplexer 8 on the one hand, and on the other hand, for exchanging with the same client terminal 2, signals for controlling the multimedia flow such as read, pause, fast forward, fast backward and stop commands.

The invention claimed is:

1. A method for transferring a first flow with a first service quality and a second flow transmitted with a second service quality, comprising:
   reserving network resources of a predetermined service quality by exchanging messages via a connectionless network protocol over a connectionless network;
   selecting a proximity server among a plurality of content servers after localization of a client terminal;
   establishing a high throughput, connection oriented link in accordance with the network resources reserved by utilization of the connectionless network protocol between the client terminal and the proximity server;
   multiplexing the first and the second flows into a same flow, wherein the first flow is transmitted at least in part via the connectionless network and comprises multimedia control signals distinct from the messages reserving network resources; and
   transmitting the multiplexed same flow to the client terminal through the high throughput, connection oriented link.

2. The method according to claim 1, wherein the high throughput, connection oriented link is of xDSL type.

3. The method according to claim 2, wherein the second flow represents audiovisual data and the multimedia control signals comprise signals for controlling the second flow.

4. The method according to claim 3, further comprising:
   connecting the client terminal to a service platform via the Internet network for requesting the audiovisual data;
   identifying the content server;
   booking, through a control platform, network resources with a predetermined service quality between the content server and the client terminal;
   activating a point-to-point session between the content server and the client terminal with the service quality established previously; and
   broadcasting contents with associated signaling signals to the client terminal through an ATM network.

5. A system for transferring a first flow with a first service quality and a second flow transmitted with a second service quality, comprising:
   means for reserving network resources of a predetermined service quality by exchanging messages via a connectionless network protocol over a connectionless network;
   means for selecting a proximity server among a plurality of content servers after localization of a client terminal;
   means for establishing a high throughput, connection oriented link in accordance with the network resources reserved by utilization of the connectionless network protocol between the client terminal and the proximity server;
   means for multiplexing the first and the second flows into a same flow, wherein the first flow is transmitted at least in part via the connectionless network and comprises multimedia control signals distinct from the messages reserving network resources; and
   means for transmitting the multiplexed same flow to the client terminal through the high throughput, connection oriented link.

6. The system according to claim 5, wherein the high throughput, connection oriented link is of xDSL type.

7. The system according to claim 6, wherein the second flow represents audiovisual data.

8. The system according to claim 6, wherein the means for establishing an xDSL link between the client terminal and the content server includes a digital multiplexer of DSLAM type and at least a first ATM switch for connecting the client terminal to the content server.

9. The system according to claim 8, further comprising a first high throughput Broadband Access Server (BAS) configured to provide a high throughput link via Internet network between the ATM network and a control network, and a second high throughput BAS configured to provide a high throughput link between the client terminal and a server of audiovisual data.

* * * * *

UNITED STATES PATENT AND TRADEMARK OFFICE
CERTIFICATE OF CORRECTION

PATENT NO.       : 7,636,375 B2                                          Page 1 of 1
APPLICATION NO.  : 10/502043
DATED            : December 22, 2009
INVENTOR(S)      : Delesalle et al.

It is certified that error appears in the above-identified patent and that said Letters Patent is hereby corrected as shown below:

On the cover page,

Item [*] Notice:   Subject to any disclaimer, the term of this patent is extended or adjusted under 35 USC 154(b) by 462 days.

Delete the phrase "by 462 days" and insert -- by 878 days --

Signed and Sealed this

Eighth Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,636,375 B2  Page 1 of 1
APPLICATION NO. : 10/502043
DATED : December 22, 2009
INVENTOR(S) : Christophe Delesalle It is certified that error appears in the above-identified patent and that said Letters Patent is hereby corrected as shown below:

Title page, item (*) Notice:  should read as follows:  Subject to any disclaimer, the term of this patent is extended or adjusted under 35 U.S.C. 154(b) by 1294 days.

Signed and Sealed this

Twentieth Day of July, 2010

David J. Kappos
*Director of the United States Patent and Trademark Office*